United States Patent [19]

Lange

[11] 4,325,602
[45] Apr. 20, 1982

[54] BINOCULAR TELESCOPE

[75] Inventor: Karl H. Lange, Bünde, Fed. Rep. of Germany

[73] Assignee: Balda-Werke Photographische Gerate & Kunststoff GmbH & Co. K.G., Bünde, Fed. Rep. of Germany

[21] Appl. No.: 1,576

[22] Filed: Jan. 8, 1979

[30] Foreign Application Priority Data

Jan. 7, 1978 [DE] Fed. Rep. of Germany ....... 2800667

[51] Int. Cl.³ .......................................... G02B 23/18
[52] U.S. Cl. ...................................... 350/36; 350/70; 350/75
[58] Field of Search .............................. 350/36, 70, 75

[56] References Cited
PUBLICATIONS

Leinhos, "The New 8×20 Pocket Binoculars", *Zeiss Inform.*, No. 73, Feb. 1970.

*Primary Examiner*—John K. Corbin
*Assistant Examiner*—Matthew W. Koren
*Attorney, Agent, or Firm*—Blum, Kaplan, Friedman, Silberman & Beran

[57] ABSTRACT

Two telescopic bodies are held together by a collapsible bridge which is hinged centrally and along the side connections between the bridge and the telescopic bodies. The three hinge axes are parallel to the optical axes of the bodies. Three or more interlocking hole elements on each hinge assure body alignment, and the side hinge pins are retained by knots in the carrying cord. The folded thickness of the telescope substantially equals the diameter of a single telescopic body.

14 Claims, 4 Drawing Figures

BINOCULAR TELESCOPE

BACKGROUND OF THE INVENTION

This invention relates generally to a binocular telescope of the type used at, for examples, the theatre, sporting events, bird watching and the like, and more particularly to a binocular telescope having a hinged and collapsible bridge whereby the binocular telescope is folded to a reduced size which is easily inserted into a clothing pocket. It is desirable that binocular telescopes should occupy a minimum amount of space when not in use. Therefore, several solutions have been propounded in the prior art in which the two telescopic bodies or monoculars can slide together to facilitate storage in a pocket.

It is known in the prior art to form a bridge linking the two telescopic bodies so that the middle planes through the bridge form a "Z" with the planes passing through the telescopic bodies and the swivel axis when the instrument is in its closed or collapsed condition. In this prior art solution to the problem of binocular size, the collapsed binocular telescope is substantially thicker than any individual telescope. As a consequence this binocular telescope when collapsed can only be stored in a pocket with difficulty. Such a binocular telescope is shown in the German Pat. DT-GM No. 7536 330.

In another binocular telescope of the prior art disclosed in German Pat. DT-OS No. 2424 792, a metal bridge is provided, against which the two telescopic bodies hinge on the same side but in the opposite directions. In this instance, the thickness of the folded telescopic unit, which determines the size of pocket in which it will be accommodated, is approximately the total of the thickness of the metal bridge plus the diameter of the telescope.

In another known design of the prior art, there is provided only one bending point on the bridge, and the telescope is folded in proportion to the strength of the bridge so that when folded, the strength of the telescopic bodies themselves is not exceeded. This solution, however, constitutes only apparent progress since it makes little sense to produce the telescopic bodies stronger than is required by the stresses normally passing through them. The flattening of a telescopic body causes the corresponding wall to draw closer to the stress path, thereby producing reflected stresses unless the telescopic bodies are enlarged to correspond to the flattening, which otherwise would not be required by the stress path per se.

What is needed is a binocular telescope which, when not in use, is folded into a small configuration without inducing undesirable stress loads in the telescopic bodies.

SUMMARY OF THE INVENTION

Generally speaking, in accordance with the invention, a foldable binocular telescope especially suited for placement in a pocket, is provided. The binocular telescope of this invention, when in the closed or folded state is not thicker, or is only slightly thicker, than the telescopic bodies. In the binocular telescope of this invention two telescopic bodies are held together by a collapsible bridge which is hinged centrally and along the side connections between the bridge and the telescopic bodies. The three hinge axes are parallel to the optical axes of the bodies. Three or more interlocking hole elements on each hinge assure body alignment, and the side hinge pins are retained by knots in the carrying cord or sling. The folded thickness of the binocular telescope of this invention substantially equals the diameter of a single telescopic body.

Accordingly, it is an object of this invention to provide a binocular telescope which is foldable when not in use.

Another object of this invention is to provide a binocular telescope which is foldable and has a folded thickness substantially equal to the diameter of the telescopic body.

A further object of this invention is to provide a binocular telescope which provides excellent alignment between the two telescopic bodies.

Still another object of this invention is to provide a binocular telescope which folds easily yet provides friction in the hinges whereby the unfolded condition is easily maintained.

Still other objects and advantages of the invention will in part be obvious and in part be apparent from the specifications.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENT

Figure 1:
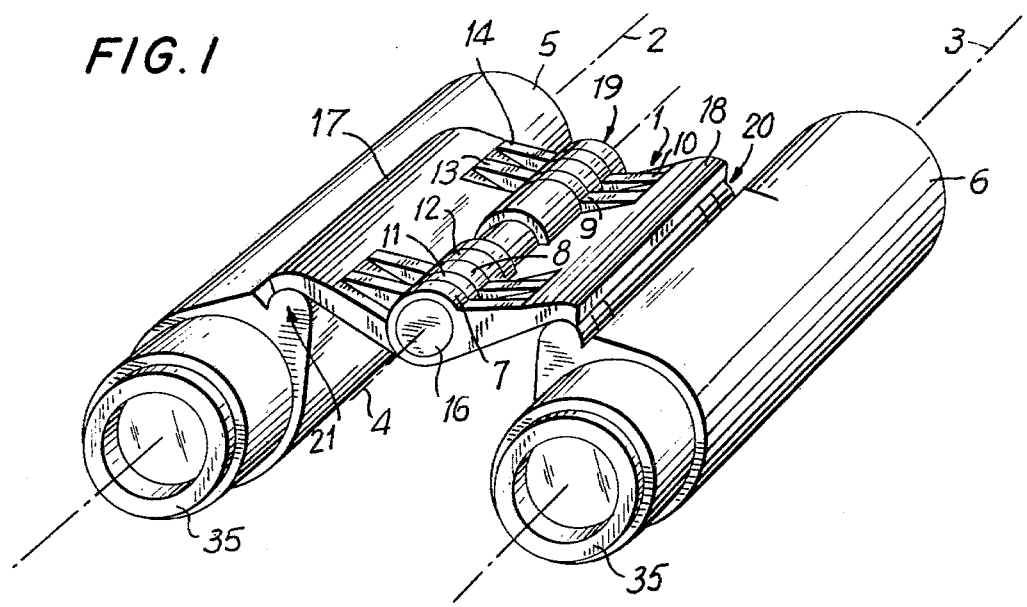
FIG. 1 is a perspective view of the binocular telescope of this invention in the open or unfolded condition.
Figure 2:
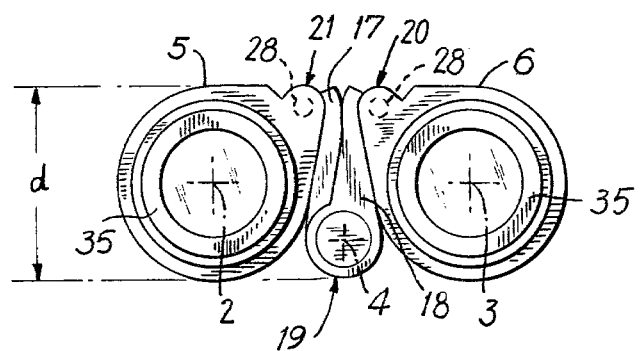
FIG. 2 is a back elevational view of the binocular telescope of FIG. 1 in the folded or closed condition.

With reference to the Figures, the binocular telescope of this invention has two telescopic bodies 5, 6 which are joined together by the bridge 1. The left telescopic body 5 is connected to the bridge 1 at the hinge 21 and the right telescopic body 6 is connected to the bridge 1 at the right side hinge 20. The bridge 1 is comprised of the left bridge segment 17 and the right bridge segment 18 joined by the middle hinge 19. The folding axis 4 for the bridge runs parallel to the optical axes 2, 3 of the telescope bodies 5, 6 respectively. The breaking axis 4 is at the midpoint of the bridge 1 between the side hinges 20, 21 and the bridge segments 17, 18 oscillate or pivot about the central breaking axis 4 when torque is applied. The hinge pin 16 connects the left and right bridge segments 17, 18 along the central breaking axis 4 by passing through holes in generally circular tabs 7, 8, 9, and 10 in the right bridge segment 18 and through similar holes in tabs 11, 12, 13, 14, on the left bridge segment 17. The tabs 7 and 8 on the right bridge segment 18 alternate and interlock with the tabs 11 and 12 on the left bridge segment 17, and the tabs 9 and 10 on the right bridge segment 18 alternate and interlock with the tabs 13 and 14 on the left bridge segment 17. Thus a precision fit is provided for rotation of the bridge segments 17, 18 about the axis 4. To collapse or fold the binocular telescope of this invention the central hinge 19 is depressed into the space between the telescope bodies 5, 6, and as best seen in FIG. 2, the telescope bodies 5, 6 are rotated inwardly toward the folded bridge 1. The distance between the middle hinge 19 and the side hinges 20, 21 allows for the binocular telescope to fold without any, or very little, extension of the hinge 19 below (FIG. 2) the lower edges of the telescopic bodies 5, 6. In other words, the thickness of the folded binocular telescope of this invention substantially equals the diameter d of the bodies 5, 6.

By providing the numerous interlocking tabs in the middle hinge 19, a friction free condition is created which insures that even after long usage the hinge does not become loose or wobbly. A highly aesthetic appearance design is provided by having the central hinge 19 at an equal distance from both side hinges 20, 21.

Because all of the bending or folding of the telescope of this invention is done along hinge lines, no bending stresses are induced in the components and accordingly the telescopic bodies 5, 6 and the bridge segments 17, 18 are made predominantly from synthetic materials, e.g. plastic. However, it must be recognized that in a high quality binocular telescope, the two telescope axes 2, 3 must run parallel to each other with a high degree of tolerance which is measured in minutes of an angle. Thus the requirements for the stability of the bridge 1 and the degree of parallelism of the axes 2, 3, 4 are very high. For this reason those parts of the bridge 1 which are made from synthetic materials are coated with metal reinforcements (not shown) by extrusion techniques. To further the stability of the hinges at least one of the parts in the hinge has at least three hinge holes. In the description above, the left and right bridge segments 17, 18 each have four tabs with holes in order to make a stable hinge connection. The outermost tabs and holes on the bridge elements 17, 18 function as guiding and aligning elements. Thus tabs 7 and 10 on bridge element 18 provide for alignment of the axes and the inner tabs 8 and 9 are fitted for the production of the required friction which makes for smooth rotation of the hinge and allows the telescope to be static in any folded position. The outer tabs on the left bridge segment 17 also serve for alignment of the axes and the inner tabs for the production of the required friction forces. The outer tabs and holes are spaced as far apart on the bridge elements as is physically feasible.

Figure 3:
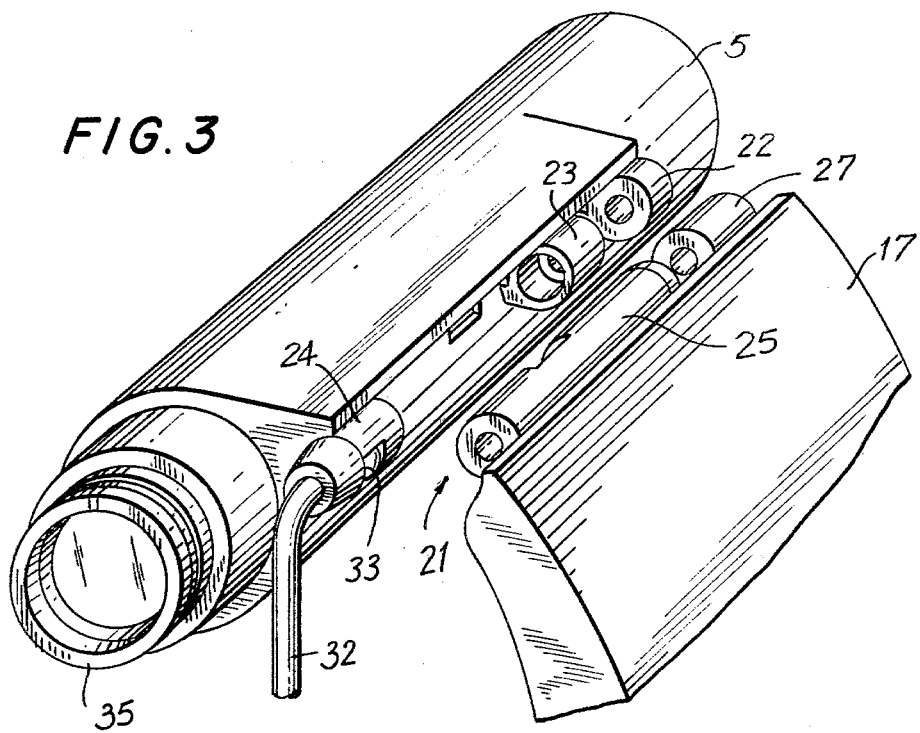
FIG. 3 is an exploded, partial perspective view to an enlarged scale of the binocular telescope of FIG. 1.
Figure 4:
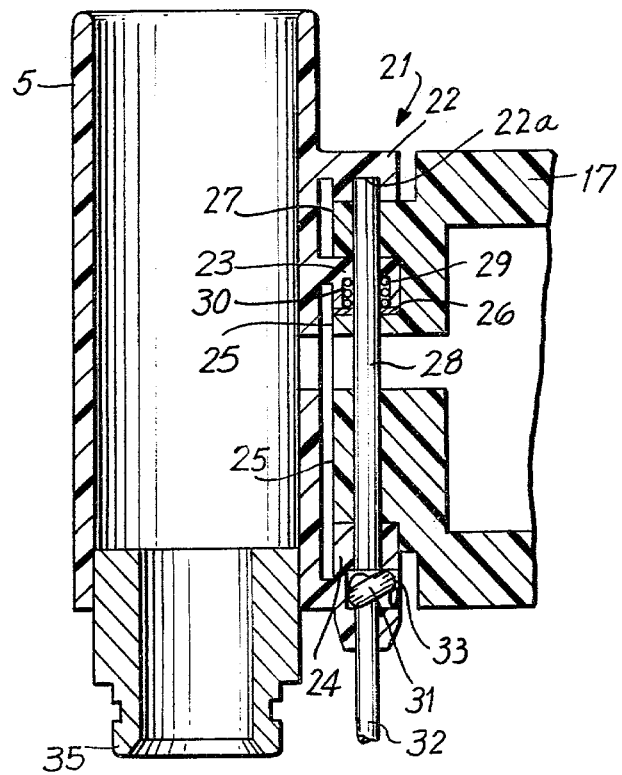
FIG. 4 is a sectional view of the components of FIG. 3 shown in an assembled condition.

FIGS. 3 and 4 illustrate the left hinge 21. The right hinge 20 is of similar construction. The telescopic body 5 includes the integral tab or hinge eye 22. The hinge eye 22 is the most forward, that is, most remote from the eyepiece 35, and has a blind hole 22a therein. The telescopic body 5 further includes two additional tabs 23, 24 having holes passing therethrough.

Barrel elements 25, 27 having aligned holes passing therethrough are integral with the left bridge element 17. When assembled (FIG. 4) the barrel element 25 fits between the two tabs 23, 24, and the barrel element 27 fits between the tabs 22, 23 with the holes in the tabs and in the barrel elements in alignment. The single hinge pin 28 passes through the entire length of the hinge and seats at one end in the blind hole 22a. There is a tight but rotatable fit between the barrel elements on the bridge element and the tabs on the telescopic body. Nevertheless, it should be noted that the disk 26 is positioned between one surface of the tab 23 and a surface of the barrel element 25. The compression spring 29 is located in an enlargement of the through hole in the tab 23. The spring 29 urges the disk 26 against the barrel element 25 and produces the necessary friction between the hinge parts connected to each other so that the binocular telescope will remain in any position of folding set by the user.

Access to the hinge pin hole in the tab 24 is provided through the side opening 33 in the tab 24. The knotted end 31 of the carrying sling or cord 32 rests within the opening 33 and the cord 32 is threaded through the lower portion of the through hole in tab 24. Thus an aesthetically pleasing point of attachment is provided for the carrying sling or cord 32 and the knot 31 of the carrying cord 32 provides a stop which prevents the hinge pin 28 from sliding out of engagement with the tab 22.

In assembling the hinge joint between the bridge elements and the telescopic bodies, the barrel elements on each bridge segment are inserted between the tabs on the telescopic bodies. Then the hinge pins 28 are slid in through the aligned hole openings starting from the back near the eyepiece 35 until the end of the hingepin 28 is seated in the blind hole 22a. Finally, the carrying sling or cord 32 is threaded through the opening in the tab 24 wherefrom it exits to the side opening 33. The knot 31 is then made at the end of the sling or cord 32 and the knot is pulled into the opening 33 to the position as best seen in FIG. 4.

It will thus be seen that the objects set forth above among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A folding binocular telescope comprising: a pair of optically aligned telescope bodies; a segmented bridge connecting said bodies, each of said bodies being hingedly attached to one segment of said bridge by a side hinge, said side hinges having their pivoting axes aligned with but offset from the optical axes of said telescope bodies; a bridge hinge joining said bridge segments, the pivoting axis of said bridge hinge being aligned with the optical axes of said telescope bodies, said side hinges, said bridge hinge, said pair of aligned telescope bodies, said segments, folding together in an accordion-type hinge, said binocular telescope when fully folded having a height substantially equaling the height of said telescope bodies and a width not exceeding three times said telescopic body height.

2. The binocular telescope of claim 1 wherein said bridge hinge axis is centered on said segmented bridge.

3. The binocular telescope of claim 1 wherein said bridge hinge includes tabs with holes therethrough, a portion of said tabs being integral with each of said bridge segments, said tabs on one segment being assembled adjacent said tabs on the other segment with said holes in alignment; and a shaft extending through said holes.

4. The binocular telescope of claim 1 or 3 wherein said bridge hinge is adapted to pivot said segments through an angle of approximately 180 degrees, said side hinges are adapted to pivot said telescope bodies substantially into contact with the associated bridge segment.

5. The binocular telescope of claim 4 wherein the distance between said side hinges and said bridge hinge is not exceeding said height of said telescope bodies.

6. A binocular telescope comprising;
a pair of optically aligned telescope bodies;
a segmented bridge connecting said bodies, each of said bodies being hingedly attached to one segment of said bridge by a side hinge, said side hinges having their pivoting axes aligned with the optical axes of said telescope bodies;
a bridge hinge joining said bridge segments, the pivoting axis of said bridge hinge being aligned with the optical axes of said telescope bodies, said bridge hinge including tabs with holes therethrough, a portion of said tabs being integral with each of said bridge segments, said tabs on one segment being assembled adjacent said tabs on the other segment with said holes in alignment; and a shaft extending through said holes, each of said bridge segments having at least three of said tabs with said holes.

7. The binocular telescope of claim 6 wherein the outer of said tabs with said holes on said bridge segments align said bridge hinge and inner ones of said tabs on said bridge segments include means for providing friction for said bridge hinge.

8. The binocular telescope of claim 1 or 7 wherein said side hinges include: tabs with holes therethrough, said tabs being integral with said telescope bodies, each of said hingedly attached bridge segments includes barrel elements with holes therethrough, said tabs on one said telescope body being assembled adjacent said barrel elements on one said bridge segment, and said tabs on the other said telescope body being assembled adjacent said barrel elements on the other said bridge segment with said holes in alignment; and shafts extending through said aligned holes.

9. The binocular telescope of claim 8 wherein each said telescope body has at least three of said tabs with said holes, and each said bridge segment has at least three of said barrel elements with holes.

10. The binocular telescope of claim 9 wherein the outer of said tabs with said holes on said bodies align said side hinges, and the outer of said barrel elements on said bridge segments align said side hinges and inner ones of said tabs and said barrel elements include means for providing friction for said side hinges.

11. The binocular telescope of claim 8 wherein said shafts through said side hinges seat in blind holes at one end and the other ends of said shafts are restrained in position by holding elements fastened to the carrying sling of said binocular telescope.

12. The binocular telescope of claim 11 wherein said holding elements are knots at the ends of said carrying sling.

13. The binocular telescope of claim 7 wherein said means for providing friction include a spring.

14. The binocular telescope of claim 10 wherein said means for providing friction include a spring.

* * * * *